(12) United States Patent
Kunihiro et al.

(10) Patent No.: US 9,108,668 B2
(45) Date of Patent: Aug. 18, 2015

(54) STEERING APPARATUS

(75) Inventors: Yoji Kunihiro, Susono (JP); Takeshi Goto, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 75 days.

(21) Appl. No.: 13/883,324

(22) PCT Filed: Nov. 10, 2011

(86) PCT No.: PCT/JP2011/075993
§ 371 (c)(1),
(2), (4) Date: May 3, 2013

(87) PCT Pub. No.: WO2012/063919
PCT Pub. Date: May 18, 2012

(65) Prior Publication Data
US 2013/0226412 A1    Aug. 29, 2013

(30) Foreign Application Priority Data

Nov. 10, 2010  (JP) .................................. 2010-251777

(51) Int. Cl.
*B62D 5/04*    (2006.01)
*B62D 6/00*    (2006.01)

(52) U.S. Cl.
CPC .............. *B62D 5/046* (2013.01); *B62D 5/0463* (2013.01); *B62D 5/0481* (2013.01); *B62D 6/007* (2013.01)

(58) Field of Classification Search
CPC .... B62D 5/046; B62D 5/0463; B62D 5/0481; B62D 6/00; B62D 6/007; B62D 101/00; B62D 113/00; B62D 119/00
USPC .................................................. 701/34.4, 42
See application file for complete search history.

(56) References Cited

U.S. PATENT DOCUMENTS

| | | | |
|---|---|---|---|
| 6,185,492 B1 * | 2/2001 | Kagawa et al. .................. | 701/41 |
| 8,121,760 B2 * | 2/2012 | Ghoneim et al. ............... | 701/42 |
| 8,165,756 B2 * | 4/2012 | Yasui et al. ..................... | 701/42 |
| 8,311,729 B2 * | 11/2012 | Saito et al. ..................... | 701/300 |
| 8,321,090 B2 * | 11/2012 | Sakuma .......................... | 701/41 |
| 2002/0011093 A1 | 1/2002 | Matsuno | |

(Continued)

FOREIGN PATENT DOCUMENTS

| JP | 2002 12160 | 1/2002 |
|---|---|---|
| JP | 2003 205849 | 7/2003 |

(Continued)

OTHER PUBLICATIONS

Yoshimoto, S., "Considerations regarding Vehicle Trajectory and Shift in Line of Sight during Left-hand Turns on Narrow Roads," Prodeedings of 2010 JSAE (Society of Automotive Engineers of Japan), Spring Convention No. 4-10, 20105163, pp. 5 to 8, (May 19, 2010) (with English abstract).

(Continued)

*Primary Examiner* — Mary Cheung
*Assistant Examiner* — Atul Trivedi
(74) *Attorney, Agent, or Firm* — Oblon, McClelland, Maier & Neustadt, L.L.P.

(57) ABSTRACT

A steering apparatus is provided with: a specifying device which is configured to specify an environment of a road on which a vehicle travels, on the basis of a manipulated amount of the steering wheel manipulated by a driver and a change of the manipulated amount in a predetermined period.

11 Claims, 10 Drawing Sheets

(56) References Cited

U.S. PATENT DOCUMENTS

| | | | |
|---|---|---|---|
| 2004/0003954 A1* | 1/2004 | Sugitani et al. | 180/402 |
| 2005/0200088 A1* | 9/2005 | Sawada et al. | 280/5.507 |
| 2005/0240328 A1* | 10/2005 | Shirato et al. | 701/41 |
| 2006/0070794 A1* | 4/2006 | Fujita et al. | 180/446 |
| 2007/0017735 A1* | 1/2007 | Kataoka et al. | 180/446 |
| 2007/0043490 A1* | 2/2007 | Yokota et al. | 701/41 |
| 2007/0284180 A1* | 12/2007 | Suehiro et al. | 180/444 |
| 2009/0093931 A1* | 4/2009 | Mizutani et al. | 701/42 |
| 2009/0248250 A1* | 10/2009 | Yasui et al. | 701/42 |
| 2009/0254253 A1* | 10/2009 | Ghoneim et al. | 701/42 |
| 2009/0271069 A1* | 10/2009 | Yamamoto et al. | 701/41 |
| 2010/0168963 A1* | 7/2010 | Yamamoto | 701/42 |

FOREIGN PATENT DOCUMENTS

| | | |
|---|---|---|
| JP | 2005 199957 | 7/2005 |
| JP | 2007 22373 | 2/2007 |
| JP | 2007 246035 | 9/2007 |

OTHER PUBLICATIONS

International Search Report Issued Feb. 21, 2012 in PCT/JP11/75993 Filed Nov. 10, 2011.

* cited by examiner

STEERING APPARATUS

TECHNICAL FIELD

The present invention relates to a steering apparatus which is mounted on a vehicle and which is configured to steer wheel in accordance with a manipulation of a steering wheel by a driver.

BACKGROUND ART

Regarding this type of steering apparatus, for example, Patent document 1 discloses a technology in which a road environment (e.g. road width) ahead of a vehicle is obtained from road map information of a navigation apparatus and in which an assist force generated by a motor is adjusted in accordance with the obtained road environment. Moreover, for example, Patent document 2 discloses a technology in which a situation of a road (e.g. a curve radius of the road) ahead of a road on which the vehicle is traveling (running) is detected on the basis of a road image taken by an in-vehicle camera and in which the magnitude of a reaction force applied to a steering wheel is changed on the basis of the detected situation.

BACKGROUND ART DOCUMENT

Patent Document

Patent document 1: Japanese Patent Application Laid Open No. 2007-22373
Patent document 2: Japanese Patent Application Laid Open No. 2005-199957

DISCLOSURE OF INVENTION

Subject to be Solved by the Invention

In the technologies described in the Patent documents 1 and 2, however, there are such a technical problem that the road environment (or situation) ahead of the vehicle cannot be obtained without the navigation apparatus, the in-vehicle camera or the like, which makes it hard to perform steering control according to the road environment.

In view of the aforementioned problem, it is therefore an object of the present invention to provide, for example, a steering apparatus which is configured to specify the environment of the road on which the vehicle travels on the basis of the manipulation of the steering wheel and which is configured to perform the steering control according to the road environment.

DISCLOSURE OF INVENTION

Subject to be Solved by the Invention

In order to solve the above object, a steering apparatus of the present invention is a steering apparatus which is mounted on a vehicle and which is configured to steer wheel in accordance with a manipulation of a steering wheel by a driver, the steering apparatus is provided with: a specifying device which is configured to specify an environment of a road on which the vehicle travels, on the basis of a manipulated amount of the steering wheel manipulated by the driver and a change of the manipulated amount in a predetermined period.

According to the steering apparatus of the present invention, for example, when the vehicle travels, the specifying device specifies the environment (e.g. road width, presence of another vehicle, etc.) of the road on which the vehicle travels, on the basis of the manipulated amount (e.g. a steering wheel angle, steering wheel torque, a steering wheel velocity, etc.) of the steering wheel which is manipulated by the driver, and the change of the manipulated amount in the predetermined period. Here, normally, the driver changes the manipulated amount of the steering wheel, unconsciously or consciously, in accordance with information about the environment of the road which is obtained from the driver's vision. In other words, the manipulated amount of the steering wheel which is manipulated by the driver changes depending on the environment of the road, regardless of the driver's conscious. Namely, the manipulated amount of the steering wheel changes depending on the environment of the road. Thus, the environment of the road can be specified on the basis of the change of the manipulated amount of the steering wheel, by obtaining in advance a relationship between the manipulated amount of the steering wheel and the environment of the road, for example, by experiments or the like.

For example, it has been confirmed by an experiment performed by the present inventors that the manipulated amount of the steering wheel is relatively small if the road width of the road on which the vehicle travels is relatively wide, and that the manipulated amount of the steering wheel is relatively large if the road width of the road on which the vehicle travels is relatively narrow. It is thus possible to specify that the road width is relatively wide if the manipulated amount of the steering wheel is relatively small, and it is possible to specify that the road width is relatively narrow if the manipulated amount of the steering wheel is relatively large.

Thus, according to the present invention, it is possible to specify the environment of the road on which the vehicle travels, on the basis of the manipulation of the steering wheel by the driver. Therefore, it is possible to perform the steering control, such as a control of a steering reaction force added to the steering wheel and a control of a steering assist force added to the wheel, in accordance with the environment specified by the specifying device. Here, particularly in the present invention, the environment of the road on which the vehicle travels is specified on the basis of the manipulated amount of the steering wheel by the driver and the change of the manipulated amount. In other words, the environment of the road is specified on the basis of characteristics of the manipulation of the steering wheel by the driver (i.e. the driver's steering characteristics). Thus, the driver's steering characteristics are reflected in the environment of the road specified by the specifying device. It is therefore possible to perform the steering control suitable for the driver's steering characteristics, by performing the steering control in accordance with the environment specified by the specifying device.

As explained above, according to the steering apparatus of the present invention, it is possible to specify the environment of the road on which the vehicle travels, on the basis of the manipulation of the steering wheel by the driver, and it is possible to perform the steering control according to the environment of the road.

In a one aspect of the steering apparatus of the present invention, the specifying device has a calculating device which is configured to calculate steering power, which is a manipulated amount of the steering wheel per unit time, on the basis of steering wheel torque which is added to the steering wheel and a steering wheel velocity of the steering wheel, and the specifying device specifies the environment of the road on which the vehicle travels on the basis of the calculated steering power According to this aspect, for example, when the vehicle travels, the steering power is calculated by the calculating device on the basis of the steering wheel torque added to the steering wheel and the steering wheel velocity of the steering wheel (i.e. a change rate of a steering wheel angle, which is a rotation angle of the steering wheel). Here, the "steering power" of the present invention means the manipulated amount of the steering wheel per unit time, i.e. means work which is provided per unit time to the steering wheel by the driver. The steering power can be calculated by multiplying the steering wheel torque and the steering wheel velocity, each of which is the manipulated amount of the steering wheel.

Particularly in this aspect, the specifying device specifies the environment of the road on which the vehicle travels (e.g. the road width, the presence of another vehicle, etc.) on the basis of the steering power calculated by the calculating device. Here, the steering power changes depending on the environment of the road. Thus, the environment of the road can be specified on the basis of the steering power, by obtaining in advance a relationship between the steering power and the environment of the road, for example, by experiments or the like. For example, it has been confirmed by an experiment performed by the present inventors that the steering power is relatively small if the road width of the road on which the vehicle travels is relatively wide, and that the steering power is relatively large if the road width of the road on which the vehicle travels is relatively narrow. It is thus possible to specify that the road width is relatively wide if the steering power is relatively small, and it is possible to specify that the road width is relatively narrow if the steering power is relatively large.

In another aspect of the steering apparatus of the present invention, the steering wheel is further provided with a steering reaction force controlling device which is configured to control a steering reaction force to be added to the steering wheel, on the basis of the specified environment.

According to this aspect, it is possible to add, to the steering wheel, the steering reaction force suitable for the environment of the road on which the vehicle is traveling, thereby improving the driver's steering feeling.

In an aspect of the steering apparatus of the present invention in which the specifying device is provided with the calculating device, the steering apparatus is further provided with a steering reaction force controlling device which is configured to control a steering reaction force to be added to the steering wheel, on the basis of the calculated steering power.

In this case, it is possible to add, to the steering wheel, the steering reaction force according to the driver's steering characteristics, thereby improving the driver's steering feeling.

In an aspect of the steering apparatus of the present invention in which the specifying device is provided with the calculating device, the specifying device specifies the environment on the basis of a chronological change of the calculated steering power.

In this case, the environment of the road on which the vehicle travels can be specified, more accurately.

In an aspect of the steering apparatus of the present invention in which the specifying device is provided with the calculating device, the specifying device determines whether or not the calculated steering power is greater than a predetermined reference value and specifies the environment on the basis of a result of the determination.

In this case, the environment of the road on which the vehicle travels can be specified, more certainly.

In an aspect of the steering apparatus of the present invention in which the specifying device determines whether or not the calculated steering power is greater than the predetermined reference value and specifies the environment on the basis of a result of the determination, the specifying device changes the predetermined reference value in accordance with a vehicle speed of the vehicle.

In this case, the environment of the road on which the vehicle travels can be specified, more accurately.

In an aspect of the steering apparatus of the present invention in which the specifying device determines whether or not the calculated steering power is greater than the predetermined reference value and specifies the environment on the basis of a result of the determination, the specifying device sets a dead zone for the predetermined reference value, does not perform the determination if the calculated steering power is within the dead zone, and performs the determination if the calculated steering power is outside the dead zone.

In this case, it is possible to prevent the environment specified by the specifying device from changing, even though the actual environment of the road does not change. Thus, the environment of the road on which the vehicle travels can be specified, more accurately.

In another aspect of the steering apparatus of the present invention, the specifying device specifies, as the environment, road width of the road on which the vehicle travels.

According to this aspect, it is possible to perform the steering control according to the road width of the road on which the vehicle travels.

In an aspect of the steering apparatus of the present invention in which the specifying device specifies, as the environment, road width of the road on which the vehicle travels, the specifying device determines whether or not the vehicle is traveling straight on the basis of the steering wheel torque and a steering wheel angle of the steering wheel, when the specifying device determines that the vehicle is traveling straight, the specifying device specifies the road width as either narrow road width or wide road width on the basis of the calculated steering power, and when the specifying device determines that the vehicle is not traveling straight, the specifying device maintains road width specified immediately before if a non-straight-traveling state does not continue for a predetermined time, and the specifying device specifies the road width as the wide road width if the non-straight-traveling state continues for the predetermined time.

In this case, the specifying device firstly determines whether or not the vehicle is traveling straight, on the basis of the steering wheel torque and the steering wheel angle. For example, if the magnitude of the steering wheel torque is less than or equal to a predetermined steering wheel torque threshold and if the magnitude of the steering wheel angle is less than or equal to a predetermined steering wheel angle threshold, the specifying device determines that the vehicle is traveling straight. In the other cases, the specifying device determines that the vehicle is not traveling straight. when the specifying device determines that the vehicle is traveling straight, the specifying device specifies the road width as either the narrow road width or the wide road width, on the basis of the calculated steering power. When the specifying device determines that the vehicle is not traveling straight, the specifying device does not specify the road width based on the steering power. When the specifying device determines that the vehicle is not traveling straight, the specifying device maintains the road width specified immediately before if the non-straight-traveling state does not continue for the predetermined time, and the specifying device specifies the road width of the road on which the vehicle is traveling as the wide road width if the non-straight-traveling state continues for the predetermined time. It is thus possible to accurately specify the road width of the road on which the vehicle travels when the vehicle is traveling straight. It is also possible to avoid that the road width of the road on which the vehicle is traveling is mistakenly specified as the narrow road width when the vehicle is not traveling straight (e.g. the vehicle is turning). Incidentally, when the vehicle is not traveling straight, the steering power could be large in some cases, even if the road width of the road on which the vehicle is traveling is relatively wide. Thus, if the specification of the road width based on the steering power is performed when it is determined that the vehicle is not traveling straight, the road width is likely mistakenly specified as the narrow road width.

In an aspect of the steering apparatus of the present invention which is provided with a steering reaction force controlling device which is configured to control a steering reaction force to be added to the steering wheel, on the basis of the calculated steering power, the steering reaction force controlling device reduces the steering reaction force in cases where the calculated steering power is large, in comparison with cases where the calculated steering power is small.

In this case, the driver's steering feeling can be certainly improved. Here, if the steering power is large (i.e. if the manipulated amount of the steering wheel per unit time by the driver is large), the driver can feel that the steering wheel is light and that it is easy to manipulate, by reducing the steering reaction force. On the other hand, if the steering power is small (i.e. if the manipulated amount of the steering wheel per unit time by the driver is small), the driver can feel that the steering wheel is stable, by increasing the steering reaction force.

In another aspect of the steering apparatus of the present invention, the steering wheel is further provided with an assist torque controlling device which is configured to control assist torque for assisting the steering wheel torque, on the basis of the specified environment.

According to this aspect, it is possible to generate the assist torque suitable for the environment of the road on which the vehicle is traveling, thereby improving the driver's steering feeling.

The operation and other advantages of the present invention will become more apparent from embodiments explained below.

MODE FOR CARRYING OUT THE INVENTION

Hereinafter, embodiments of the present invention will be explained with reference to the drawings.

First Embodiment

A steering apparatus in a first embodiment will be explained with reference to FIG. 1 to FIG. 5.

Firstly, an entire configuration of a vehicle which is provided with the steering apparatus in the first embodiment will be explained with reference to FIG. 1.

Figure 1:
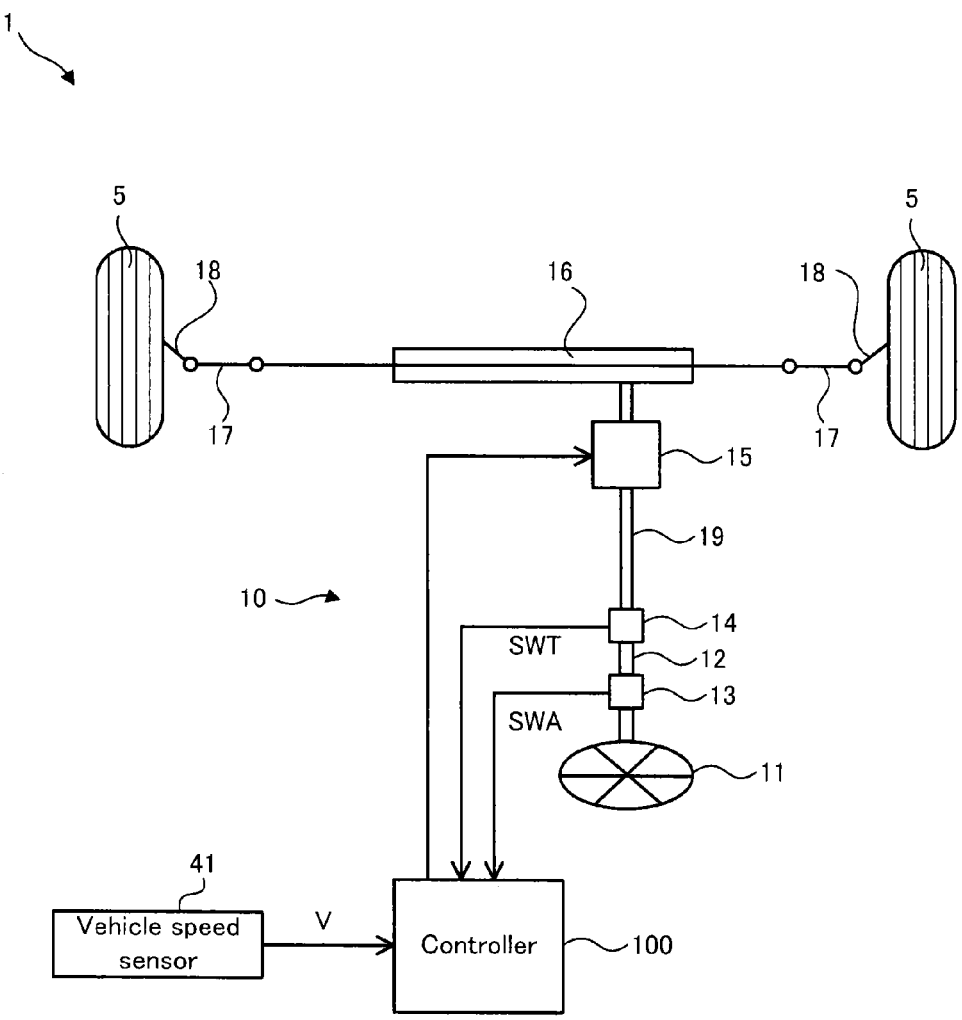
FIG. 1 is a block diagram illustrating an entire configuration of a vehicle which is provided with a steering apparatus in a first embodiment.

FIG. 1 is a block diagram illustrating the entire configuration of the vehicle which is provided with the steering apparatus in the first embodiment.

As illustrated in FIG. 1, a vehicle 1 is provided with front wheels 5 and a steering apparatus 10 which is configured to steer the front wheels 5. The steering apparatus 10 is an electric power steering (EPS) apparatus which is configured to steer the front wheels 5 in accordance with an operation of a steering wheel 11. The steering apparatus 10 is provided with the steering wheel 11, a steering shaft 12, a pinion shaft 19, a steering wheel angle sensor 13, a torque sensor 14, a motor 15, a rack and pinion mechanism 16, tie rods 17, knuckle arms 18, a vehicle speed sensor 41, and a controller 100.

The steering wheel 11 is one example of the "steering wheel" of the present invention, and is manipulated by a driver to turn the vehicle 1 or to perform similar actions. The steering wheel 11 is connected to the rack and pinion mechanism 16 via the steering shaft 12 and the pinion shaft 19. The steering shaft 12 is equipped with the steering wheel angle sensor 13 and the torque sensor 14.

The steering wheel angle sensor 13 detects a steering wheel angle SWA (i.e. a rotation angle of the steering wheel 11) corresponding to the manipulation of the steering wheel 11 by the driver. The steering wheel angle sensor 13 outputs, to the controller 100, a detection signal corresponding to the detected steering wheel angle SWA.

The torque sensor 14 detects steering wheel torque SWT added to the steering shaft 12 via the steering wheel 11. The torque sensor 22 outputs, the controller 100, a detection signal corresponding to the detected steering wheel torque SWT.

One end of the pinion shaft 19 is coupled with the rack and pinion mechanism 16. The other end of the pinion shaft 19 is coupled with the steering shaft 12 via the torque sensor 14. The pinion shaft 19 is configured to rotate in the same direction as that of the steering shaft 12. The pinion shaft 19 is equipped with the motor 15.

The motor 15 is provided with a reduction gear, an electric motor, and the like, and adds torque to the pinion shaft 19 under the control by the controller 100. Incidentally, hereinafter, the torque which is added to the pinion shaft 19 by the motor 15 will be referred to as "assist torque", as occasion demands.

The vehicle speed sensor 41 detects a vehicle speed (velocity of a vehicle 10) and outputs, to the controller 100, a detection signal corresponding to the detected vehicle speed V.

The rack and pinion mechanism 16 is provided with a rack and a pinion. A rotation is transmitted from the steering shaft 12 to the rack and pinion mechanism 16 via the pinion shaft 19, and thus, the rack and pinion mechanism 16 operates. The rack and pinion mechanism 16 is coupled with the tie rods 17 and the knuckle arms 18, and the front wheels 5 are coupled with the knuckle arms 18. In this case, the tie rods 17 and the knuckle arms 18 are operated by the rack and pinion mechanism 16, by which the front wheels 5 which are coupled with the knuckle arms 18 are steered.

The controller 100 is an electronic control unit which is provided with a central processing unit (CPU), a read only memory (ROM), a random access memory (RAM), and the like. The controller 100 has a function as one example of the "calculating device" of the present invention, and calculates steering power P, which is a manipulated amount of the steering wheel 11 per unit time, on the basis of the detection signals respectively outputted from the steering wheel angle sensor 13 and the torque sensor 14. Moreover, the controller 100 has a function as one example of the "specifying device" of the present invention, and specifies road width of a road on which the vehicle 1 travels, on the basis of the calculated steering power P. In addition, the controller 100 has a function as one example of the "steering reaction force controlling device" and the "assist torque controlling device" of the present invention, and sets a target steering reaction force which is to be added to the steering wheel 11, and the assist torque which is to be added to the pinion shaft 19 by the motor 15. The controller 100 performs steering reaction force control for controlling the motor 15, such that the set target steering reaction force is added to the steering wheel 11. In other words, in the steering reaction force control, the assist torque which is added to the pinion shaft 19 by the motor 15 is controlled by the controller 100 such that the target steering reaction force is added to the steering wheel 11.

Next, the steering reaction force control of the steering apparatus 10 in the first embodiment will be explained in detail with reference to FIG. 2 to FIG. 5.

Figure 2:
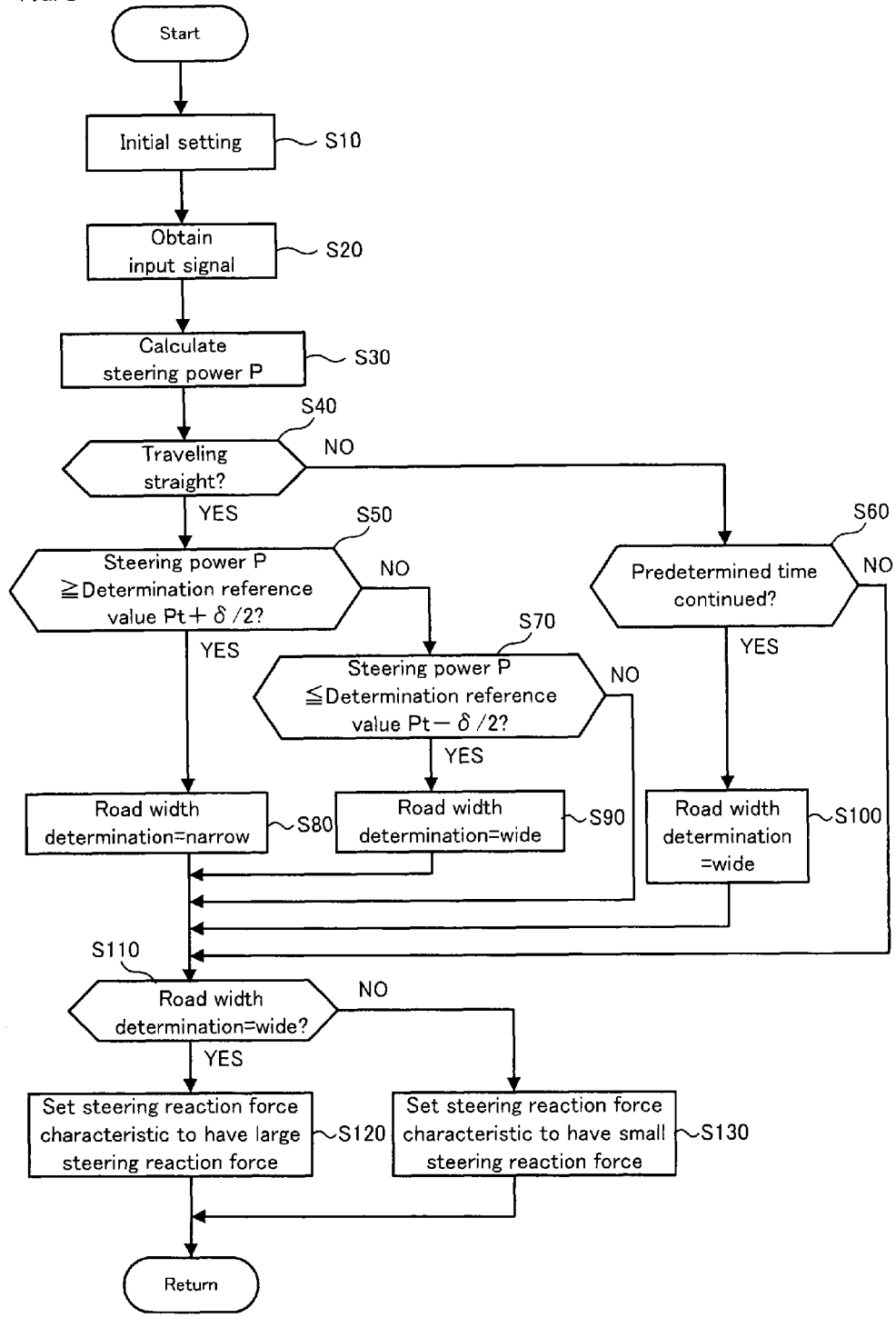
FIG. 2 is a flowchart conceptually illustrating a flow of steering reaction force control of the steering apparatus in the first embodiment.

FIG. 2 is a flowchart conceptually illustrating a flow of the steering reaction force control of the steering apparatus 10 in the first embodiment.

In FIG. 2, firstly, initial setting is performed by the controller 100 (step S10). Specifically, the controller 100 sets predetermined initial values for predetermined thresholds SWAt and SWTt, a predetermined determination reference value Pt, a width δ of a dead zone D, predetermined times Ta and Tb, a straight-traveling determination value, and a road width determination value, all of which will be described later. For example, the controller 100 sets "wide" for the road width determination value as an initial value.

Then, an input signal is obtained by the controller 100 (step S20). Specifically, the controller 100 obtains the detection signal corresponding to the steering wheel angle SWA from the steering wheel angle sensor 13, and obtains the detection signal corresponding to the steering wheel torque SWT from the torque sensor 14, as the input signal. Incidentally, information about the steering wheel angle SWA may be obtained from a rotation angle of an EPS motor (i.e. the motor 15) and a tire turning angle (i.e. a steering angle of the front wheels 5), instead of the steering wheel angle sensor 13.

The controller 100 obtains the input signal at intervals of predetermined sampling times Ts. At this time, the controller 100 divides the steering wheel angle SWA by the sampling time Ts, thereby calculating a steering wheel velocity SWV. In other words, the controller 100 calculates the steering wheel velocity SWV in accordance with the following equation (1).

Steering wheel velocity SWV=(Steering wheel angle SWA($n$)−Steering wheel angle SWA($n$−1))/Sampling time $Ts$     (1)

Incidentally, n is a natural number, and the steering wheel angle SWA(n) means the n-th steering wheel angle SWA obtained.

Incidentally, when the input signal is obtained, low-pass filtering process for removing a high-frequency component of the input signal is performed.

Then, the steering power P is calculated by the controller 100 (step S30). In other words, the controller 100 calculates the steering power P on the basis of the steering wheel torque SWT and the steering wheel velocity SWV. The steering power P means work which the driver performs to the steering wheel 11 per unit time.

Specifically, the controller 100 firstly calculates mean (average) value SWTmean of the steering wheel torque SWT which is obtained once in every sampling time Ts between a current time point and a past time point which is obtained by going back from the current time point by a predetermined time Ta. The controller 100 firstly calculates mean (average) value SWVmean of the steering wheel velocity SWV which is obtained once in every sampling time Ts between the current time point and the past time point which is obtained by going back from the current time point by the predetermined time Ta. Then, the controller 100 calculates a mean value SWTa, in the predetermined time Ta, of the absolute value of a difference between the steering wheel torque SWT and the mean value SWTmean. The controller 100 calculates a mean value SWVa, in the predetermined time Ta, of the absolute value of a difference between the steering wheel velocity SWV and the mean value SWVmean. Then, the controller 100 multiplies the mean value SWTa and the mean value SWVa, thereby calculating the steering power P. In other words, the controller 100 calculates the steering power P in accordance with the following equation (2).

Steering power $P$=Mean value SWTa of Steering wheel torque×Mean value SWVa of Steering wheel angle     (2)

In other words, the controller 100 calculates respective mean values of change (or variation) of the steering wheel torque SWT and the steering wheel velocity SWV obtained between the current time point and the past time point which is obtained by going back from the current time point by the predetermined time Ta, thereby calculating the product of the calculated mean values as the steering power P.

Then, it is determined by the controller 100 whether or not the vehicle 1 is traveling straight (step S40). In other words, the controller 100 determines whether or not the vehicle 1 is traveling straight, on the basis of the steering wheel angle SWA and the steering wheel torque SWT. Incidentally, if determining that the vehicle 1 is traveling straight (the step S40: YES), the controller 100 sets "YES" for the straight-traveling determination value which indicates whether or not the vehicle 1 is traveling straight. If determining that the vehicle 1 is not traveling straight (the step S40: NO), the controller 100 sets "NO" for the straight-traveling determination value.

Figure 3:
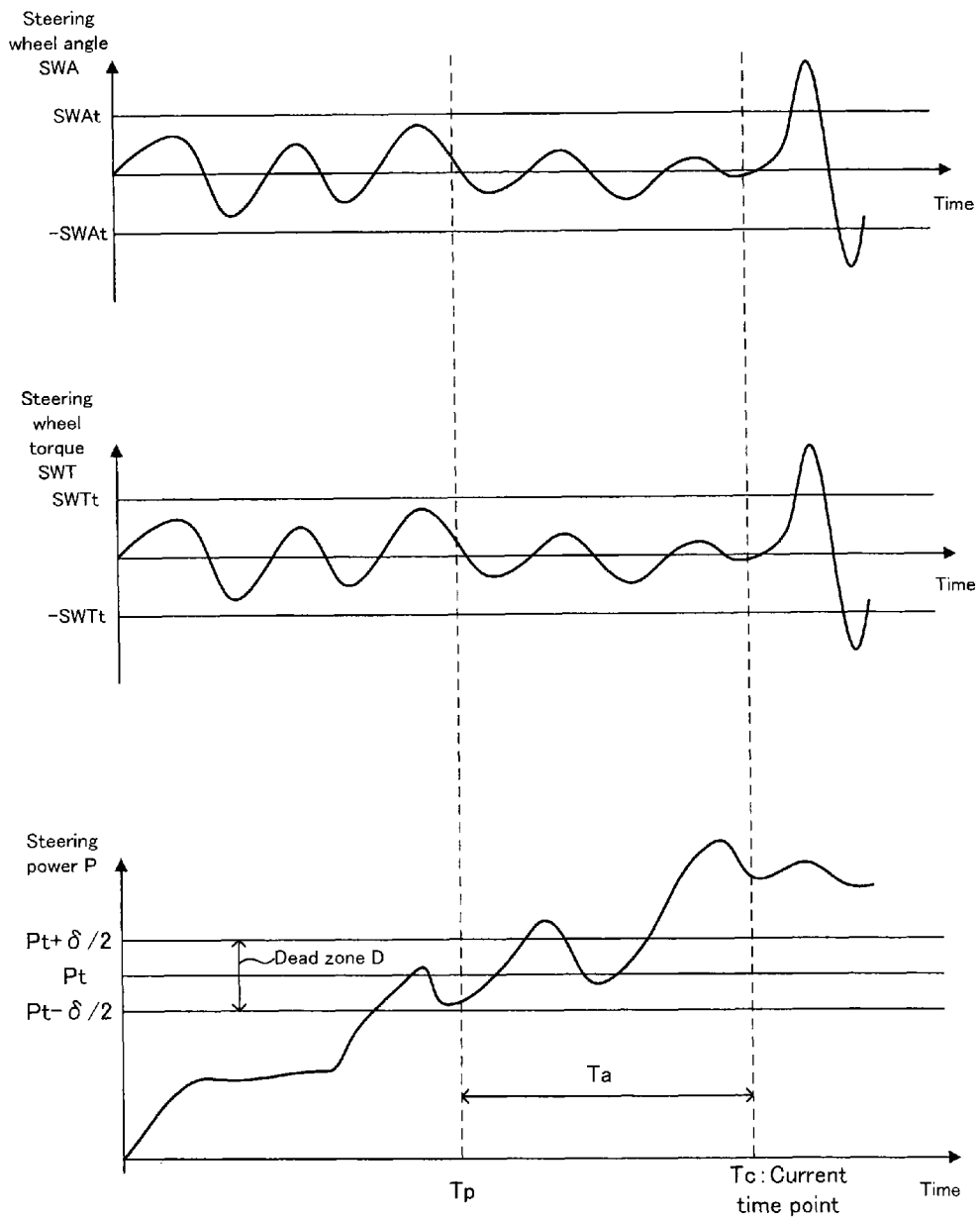
FIG. 3 is a diagram for explaining the processing of specifying road width in the steering reaction control of the steering apparatus in the first embodiment.

FIG. 3 is a diagram for explaining the process of specifying the road width in the steering reaction control of the steering apparatus in the first embodiment. FIG. 3 illustrates one example of chronological changes of the steering wheel angle SWA and the steering wheel torque SWT which are obtained by the controller 100 and of the steering power P which is calculated by the controller 100. Incidentally, in the first embodiment, as illustrated in FIG. 3, the direction of the steering wheel angle SWA and the direction of the steering wheel torque SWT are expressed by positive and negative signs. For example, a negative value is set to be a right-turn direction of the steering wheel 11, and a positive value is set to be a left-turn direction of the steering wheel 11.

In FIG. 3, the controller 100 determines that the vehicle 1 is traveling straight if the magnitude of the steering wheel angle SWA (i.e. the absolute value of the steering wheel angle SWA) is less than or equal to the predetermined threshold SWAt and if the magnitude of the steering wheel torque SWT (the absolute value of the steering wheel torque SWT) is less than or equal to the predetermined threshold SWTt (step S40). The controller 100 determines that the vehicle 1 is not traveling straight in the other cases, i.e. if the magnitude of the steering wheel angle SWA is greater than the predetermined threshold SWAt or if the magnitude of the steering wheel torque SWT is greater than the predetermined threshold SWTt (step S40). In other words, the controller 100 determines that the vehicle 1 is traveling straight if both of the following equations (3) and (4) are satisfied, and the controller 100 determines that the vehicle 1 is not traveling straight if at least one of the following equations (3) and (4) is not satisfied.

$$\text{Magnitude of Steering wheel angle } SWA \leq \text{Predetermined threshold } SWAt \quad (3)$$

$$\text{Magnitude of Steering wheel torque } SWT \leq \text{Predetermined threshold } SWTt \quad (4)$$

Back in FIG. 2, if it is determined that the vehicle is traveling straight (the step S40: YES), it is determined by the controller 100 whether or not the steering power P is greater than or equal to the determination reference value $Pt+\delta/2$ (step S50).

In other words, in FIG. 3, the controller 100 determines whether or not the steering power P is greater than or equal to the determination reference value $Pt+\delta/2$ at a current time point Tc (the step S50). Namely, the controller 100 determines whether or not the following equation (5) is satisfied.

$$\text{Steering power } P \geq \text{Determination reference value } Pt+\delta/2 \quad (5)$$

Here, the determination reference value Pt is one example of the "predetermined reference value" of the present invention. The determination reference value Pt is a value of the steering power P which is a border at which it is differentiated whether the road width of the road, on which the vehicle 1 travels, is wide or narrow. The determination reference value Pt is set in advance, for example, by experiments or the like. Specifically, the determination reference value Pt is set as the minimum value of the steering power P which leads to the determination that the road width of the road on which the vehicle 1 travels is narrow. In other words, the determination reference value Pt is set as the steering power P which leads to a change of the target steering reaction force. Here, it has been confirmed by experiments performed by the present inventors that the steering power P is small if the road width of the road on which the vehicle 1 travels is wide, and that the steering power P is large if the road width of the road on which the vehicle 1 travels is narrow. Thus, a chronological change of the road width of the road on which the vehicle 1 travels can be detected on the basis of a chronological change of the steering power P. Therefore, in the first embodiment, one of the two different road widths which can be significantly differentiated by the steering power P is set to be wide road width, and the other of the two different road widths is set to be narrow road width. At the same time, the steering power P which leads to the differentiation between the wide road width and the narrow road width is set as the determination reference value Pt.

As illustrated in FIG. 3, the dead zone D whose width is $\delta$ is set with respect to the determination reference value Pt. The dead zone D is set as a range of the steering power P in which it is not determined whether or not the steering power P is greater than the determination reference value Pt. The dead zone D has the width $\delta$ whose center corresponds to the determination reference value Pt. In other words, an upper limit of the dead zone D is a value which is obtained by adding a width $\delta/2$ (i.e. half of the width $\delta$ of the dead zone D) to the determination reference value Pt, and a lower limit of the dead zone D is a value which is obtained by subtracting the width $\delta/2$ from the determination reference value Pt.

If it is determined that the steering power P is greater than or equal to the determination reference value $Pt+\delta/2$ (the step S50: YES), it is determined by the controller 100 that the road width of the road on which the vehicle 1 is traveling is narrow, and the road width determination value is set to be "narrow" (step S80).

Here, the road width determination value is a value which indicates the road width determined by the controller 100. The road width determination value is set to be "narrow" if it is determined that the road width is narrow. The road width determination value is set to be "wide" if it is determined that the road width is wide. Incidentally, as described above, in the initial setting (the step S10), the road width determination value is set to be "wide".

On the other hand, if it is determined that the steering power P is not greater than or equal to the determination reference value $Pt+\delta/2$ (i.e. the steering power P is less than the determination reference value $Pt+\delta/2$ (the step S50: NO), it is determined by the controller 100 whether or not the steering power P is less than or equal to the determination reference value $Pt-\delta/2$ (step S70).

In other words, in FIG. 3, the controller 100 determines whether or not the steering power P is less than or equal to the determination reference value $Pt-\delta/2$ at the current time point Tc (the step S70). Namely, the controller 100 determines whether or not the following equation (6) is satisfied.

$$\text{Steering power } P \leq \text{Determination reference value } Pt-\delta/2 \quad (6)$$

If it is determined that the steering power P is less than or equal to the determination reference value $Pt-\delta/2$ (the step S70: YES), it is determined by the controller 100 that the road width of the road on which the vehicle 1 is traveling is wide, and the road width determination value is set to be "wide" (step S90).

On the other hand, if it is determined that the steering power P is not less than or equal to the determination reference value $Pt-\delta/2$ (i.e. the steering power P is greater than the determination reference value $Pt-\delta/2$) (the step S70: NO), the road width determination value is maintained without change by the controller 100. Then, processing associated with a step S110 described later is performed.

Incidentally, the determination reference value Pt may be changed by the controller 100 in accordance with the vehicle speed. In this case, the determination of whether the road width of the road on which the vehicle 1 travels is wide or narrow can be performed, more accurately, on the basis of the steering power P.

Particularly in the first embodiment, as described above, the dead zone D is set for the determination reference value Pt. It is thus possible to prevent a determination result of the road width by the controller 100 from changing although the actual road width of the road does not change.

In FIG. 2, if it is determined that the vehicle is not traveling straight (the step S40: NO), it is determined by the controller 100 whether or not the not-straight-traveling state, at which the vehicle is not traveling straight, continues for a predetermined time Tb (step S60).

If it is determined that the not-straight-traveling state continues for the predetermined time Tb (the step S60: YES), the road width determination value is set to be "wide" by the controller 100 (step S100).

On the other hand, if it is determined that the not-straight-traveling state does not continue for the predetermined time Tb (i.e. a time for which the non-straight-traveling state continues is shorter than the predetermined time Tb) (the step S60: NO), the road width determination value is maintained without change by the controller 100, and the processing associated with the step S110 described later is performed.

Here, with reference to FIG. 4, an explanation will be given to each processing (the steps S60 and S100) performed in cases where it is determined that the vehicle is not traveling straight (the step S40: NO).

Figure 4:
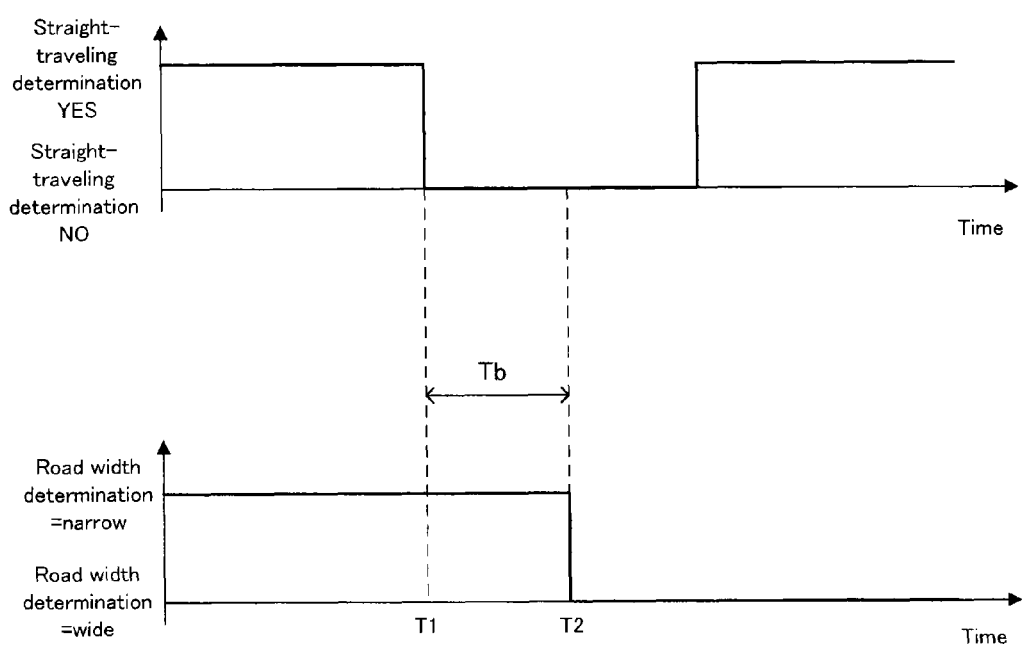
FIG. 4 is a diagram for explaining processing performed in cases where it is determined that the vehicle is not traveling straight in the specification of the road width in the first embodiment.

FIG. 4 is a diagram for explaining the processing performed in cases where it is determined that the vehicle is not traveling straight in the specification of the road width in the first embodiment.

As illustrated in FIG. 4, if the straight-traveling determination value is changed from "YES" to "NO" at a time point T1 and the straight-traveling determination value remains set to be "NO" for the predetermined time Tb (the step S60: YES), the road width determination value is set to be "wide" (step S100). In other words, if the straight-traveling determination value remains set to be "wide" between the time point T1 at which the straight-traveling determination value is changed from "YES" to "NO", and a time point T2 which is obtained by going on from the time point T1 by the predetermined time Tb, then, the road width determination value is set to be "wide" at the time point T2. In other words, particularly in the first embodiment, the controller 100 sets the road width determination value to be "wide", regardless of the road width determination value at that time point, if the non-straight-traveling state continues for the predetermined time Tb. In other words, the controller 100 determines that the road width of the road on which the vehicle 1 is traveling is wide if the non-straight-traveling state continues for the predetermined time Tb. It is thus possible to avoid that the road width of the road on which the vehicle 1 is traveling is mistakenly determined to be narrow in cases where the vehicle 1 is not traveling straight (e.g. the vehicle 1 is turning). Incidentally, in cases where the vehicle 1 is not traveling straight, the steering power P could be greater than the determination reference value Pt+δ/2 in some cases even if the road width of the road on which the vehicle 1 is traveling is wide. Thus, if the determination of the road width is performed on the basis of the steering power P in a case where it is determined that the vehicle 1 is not traveling straight (in the step S40), the road width is likely mistakenly determined to be narrow.

Back in FIG. 2, after the steps S80, S90, and S100, it is determined by the controller 100 whether or not the road width determination value is set to be "wide" (step S110).

If determining that the road width determination value is set to be "wide" (the step S110: YES), the controller 100 sets a steering reaction force characteristic to a characteristic of "large steering reaction force". If determining that the road width determination value is not set to be "wide" (i.e. the road width determination value is set to be "narrow") (the step S110: NO), the controller 100 sets the steering reaction force characteristic to a characteristic of "small steering reaction force". Incidentally, setting the steering reaction force characteristic to the characteristic of "large steering reaction force" means setting map data, which is referred to by the controller 100 for the steering reaction force control, to map data ATws, ATwm, or ATwh out of a map M1 described later with reference to FIG. 5. Incidentally, setting the steering reaction force characteristic to the characteristic of "small steering reaction force" means setting the map data, which is referred to by the controller 100 for the steering reaction force control, to map data ATns, ATnm, or ATnh out of the map M1 described later with reference to FIG. 5.

Here, the setting of the steering reaction force characteristic in the first embodiment will be explained with reference to FIG. 5.

Figure 5:
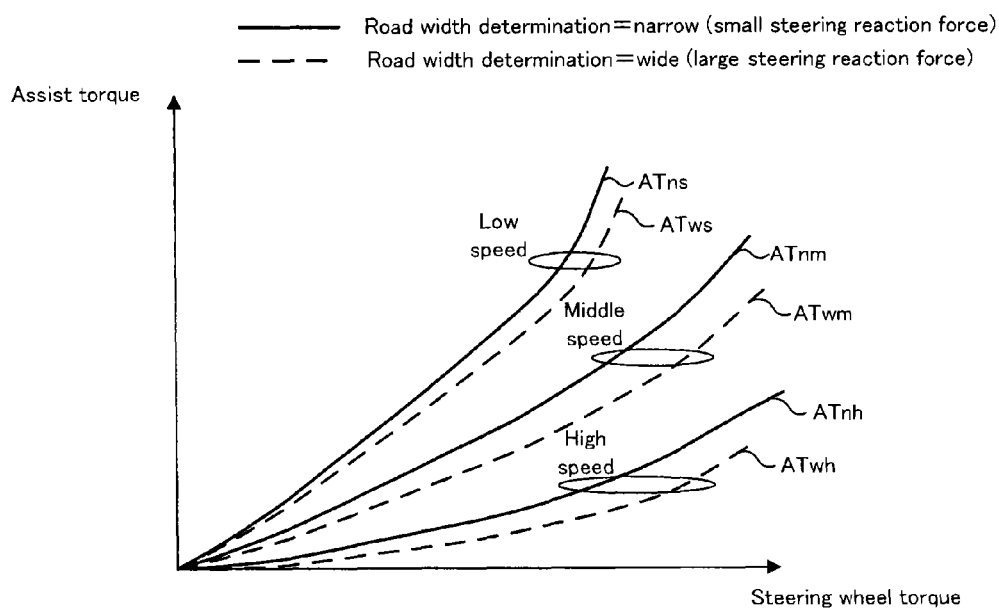
FIG. 5 is a diagram conceptually illustrating one example of a map for setting assist torque in the first embodiment.

FIG. 5 is a diagram conceptually illustrating one example of a map for setting the assist torque to be added to the pinion shaft 19 by the motor 15.

In FIG. 5, the map M1 is a map for defining a relationship between the steering wheel torque SWT and the assist torque. In the map M1, the relationship between the steering wheel torque SWT and the assist torque is defined, in cases where the road width determination value is set to be "wide" and in cases where the road width determination value is set to be "narrow", in each of a plurality of vehicle speed regions which are different from one another, such as, for example, low-speed, middle-speed, and high-speed regions. Incidentally, the first embodiment exemplifies that the relationship between the steering wheel torque SWT and the assist torque is defined in each of the three different vehicle speed regions, such as the low-speed, middle-speed, and high-speed regions, in the map M1; however, the number of the vehicle-speed regions is not limited to three, but may be two, or four or more.

In other words, the map M1 has the map data ATns, ATws, ATnm, ATwm, ATnh, and ATwh. The map data ATns is map data for setting the assist torque in accordance with the steering wheel torque SWT, in cases where the vehicle speed V is low-speed and in cases where the road width determination value is set to be "narrow". The map data ATws is map data for setting the assist torque in accordance with the steering wheel torque SWT, in cases where the vehicle speed V is low-speed and in cases where the road width determination value is set to be "wide". The map data ATnm is map data for setting the assist torque in accordance with the steering wheel torque SWT, in cases where the vehicle speed V is middle-speed and in cases where the road width determination value is set to be "narrow". The map data ATwm is map data for setting the assist torque in accordance with the steering wheel torque SWT, in cases where the vehicle speed V is middle-speed and in cases where the road width determination value is set to be "wide". The map data ATnh is map data for setting the assist torque in accordance with the steering wheel torque SWT, in cases where the vehicle speed V is high-speed and in cases where the road width determination value is set to be "narrow". The map data ATwh is map data for setting the assist torque in accordance with the steering wheel torque SWT, in cases where the vehicle speed V is high-speed and in cases where the road width determination value is set to be "wide". Incidentally, the middle speed is set in advance as a faster vehicle speed region than the low speed, and the high speed is set in advance as a faster vehicle speed region than the middle speed.

Particularly in the first embodiment, in the map M1, the relationship between the steering wheel torque SWT and the assist torque is defined such that the assist torque in cases where the road width determination value is set to be "narrow" (refer to the map data ATns, ATnm, and ATnh) is greater than the assist torque in cases where the road width determination value is set to be "wide" (refer to the map data ATws, ATwm, and ATwh). In other words, the controller 100 refers to the map M1, and in cases where the road width determination value is set to be "narrow", the controller 100 sets the assist torque to have a larger value than in cases where the road width determination value is set to be "wide" (in other words, the controller 100 sets the target steering reaction force which is to be added to the steering wheel 11, to have a smaller value). Conversely, the controller 100 refers to the map M1, and in cases where the road width determination value is set to be "wide", the controller 100 sets the assist torque to have a smaller value than in cases where the road width determination value is set to be "narrow" (in other words, the controller 100 sets the target steering reaction force which is to be added to the steering wheel 11, to have a larger value).

The controller 100 controls the motor 15 such that the assist torque set in this manner is added to the pinion shaft 19 from the motor 15 (in other words, such that the target steering reaction force set in this manner is added to the steering wheel 11).

Thus, the driver's steering feeling can be improved. Specifically, in cases where the road width determination value is set to be "narrow", i.e. in cases where the steering power P is greater than the determination reference value Pt+δ/2, in other words, in cases where the manipulated amount of the steering wheel 11 per unit time by the driver is large, the driver can feel that the steering wheel 11 is light and that it is easy to manipulate, by reducing the steering reaction force. On the other hand, in cases where the road width determination value is set to be "wide", i.e. in cases where the steering power P is less than the determination reference value Pt−δ/2, in other words, in cases where the manipulated amount of the steering wheel 11 per unit time by the driver is small, the driver can feel that the steering wheel 11 is stable, by increasing the steering reaction force.

As explained above, according to the steering apparatus 10 in the first embodiment, by virtue of the controller 100, the steering power P is calculated, and it is determined whether the road width of the road on which the vehicle 1 travels is wide or narrow, on the basis of the calculated steering power P. It is thus possible to determine whether the road width of the road on which the vehicle 1 travels is wide or narrow, on the basis of the manipulation of the steering wheel 11 by the driver, without using, for example, a navigation apparatus, an in-vehicle camera, or the like. Moreover, since the steering reaction force control is performed in accordance with a result of the determination as determined above, it is possible to add the steering reaction, which is suitable for the road width of the road on which the vehicle 1 travels, to the steering wheel 11 and to improve the driver's steering feeling. Here, particularly in the first embodiment, the road width of the road on which the vehicle 1 travels is specified to be wide or narrow, on the basis of the steering power P. In other words, the road width of the road is specified on the basis of characteristics of the manipulation of the steering wheel 11 by the driver (i.e. the driver's steering characteristics). Thus, the driver's steering characteristics are reflected in the road width of the road specified by the controller 100. Therefore, as in the first embodiment, by performing the steering reaction force control according to the road width specified on the basis of the steering power P, it is possible to perform the steering reaction force control which is suitable for the driver's steering characteristics.

Second Embodiment

A steering apparatus in a second embodiment will be explained with reference to FIG. 6.

The steering apparatus in a second embodiment is different from the steering apparatus 10 in the first embodiment described above, in the method of setting the assist torque based on the result of the determination of whether the road width of the road is wide or narrow (i.e. the road width determination value). In other points, the steering apparatus in the second embodiment is configured in substantially the same manner as the steering apparatus 10 in the first embodiment described above.

Figure 6:
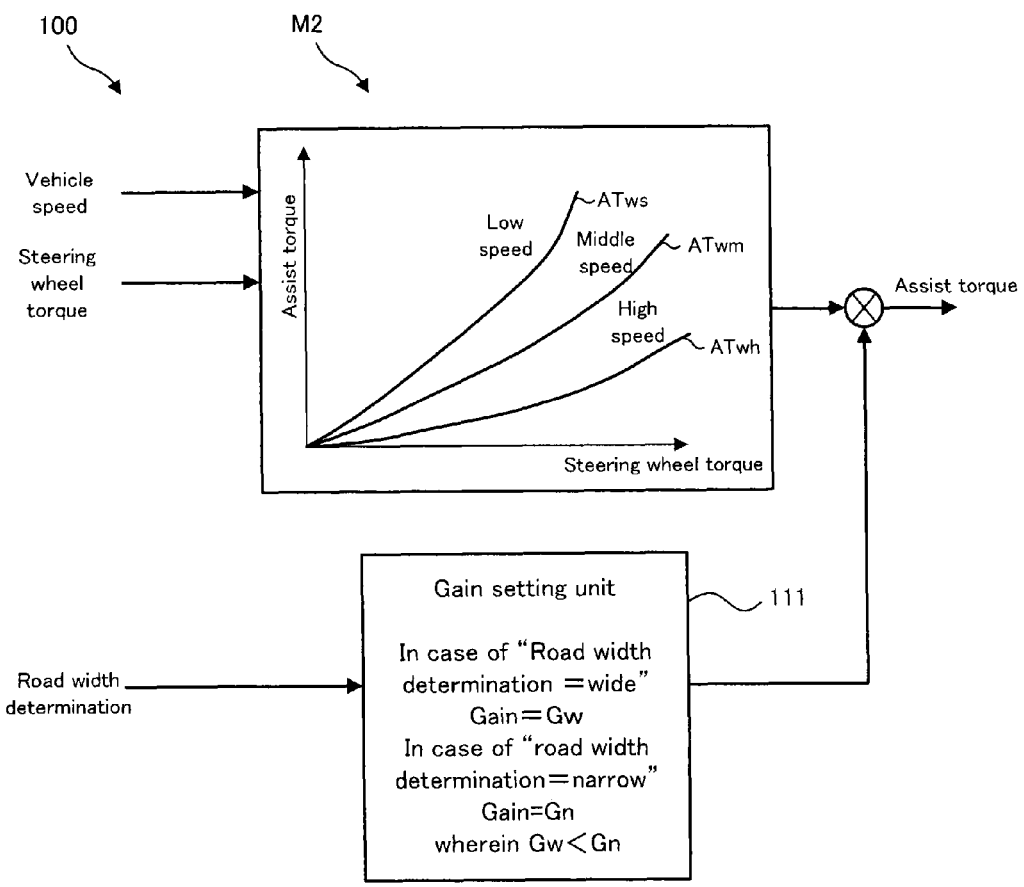
FIG. 6 is a diagram conceptually illustrating a method of setting the assist torque based on a road width determination value in a second embodiment.

FIG. 6 is a diagram conceptually illustrating a method of setting the assist torque based on the road width determination value in the second embodiment.

In FIG. 6, in the second embodiment, the controller 100 has a map M2 and a gain setting unit 111.

The map M2 is a map for defining the relationship between the steering wheel torque SWT and the assist torque. In the map M2, the relationship between the steering wheel torque SWT and the assist torque is defined in each of a plurality of vehicle speed regions which are different from one another, such as, for example, low-speed, middle-speed, and high-speed regions.

Incidentally, the second embodiment exemplifies that the relationship between the steering wheel torque SWT and the assist torque is defined in each of the three different vehicle speed regions, such as the low-speed, middle-speed, and high-speed regions, in the map M2; however, the number of the vehicle-speed regions is not limited to three, but may be two, or four or more.

The gain setting unit 111 sets a gain in accordance with the road width determination value. Specifically, the gain setting unit 111 sets the gain at a predetermined value Gw (e.g. "1") in cases where the road width determination value is set to be "wide". The gain setting unit 111 sets the gain at a predetermined value Gn (e.g. "1.2") which is greater than the predetermined value Gw in cases where the road width determination value is set to be "narrow."

The controller 100 sets the assist torque on the basis of the vehicle speed V, the steering wheel torque SWT, and the map M2, and sets the product of the set assist torque and the gain, which is set by the gain setting unit 111, as final assist torque.

Here, the gain value Gn in cases where the road width determination value is set to be "narrow" is greater than the gain value Gw in cases where the road width determination value is set to be "wide". Thus, the final assist torque set in cases where the road width determination value is set to be "narrow" is greater than the final assist torque set in cases where the road width determination value is set to be "wide". Therefore, in cases where the road width determination value is set to be "narrow", the steering reaction force can be reduced in comparison with cases where the road width determination value is set to be "wide". Conversely, in cases where the road width determination value is set to be "wide", the steering reaction force can be increased in comparison with cases where the road width determination value is set to be "narrow". Therefore, the driver's steering feeling can be improved.

Third Embodiment

A steering apparatus in a third embodiment will be explained with reference to FIG. 7.

Figure 7:
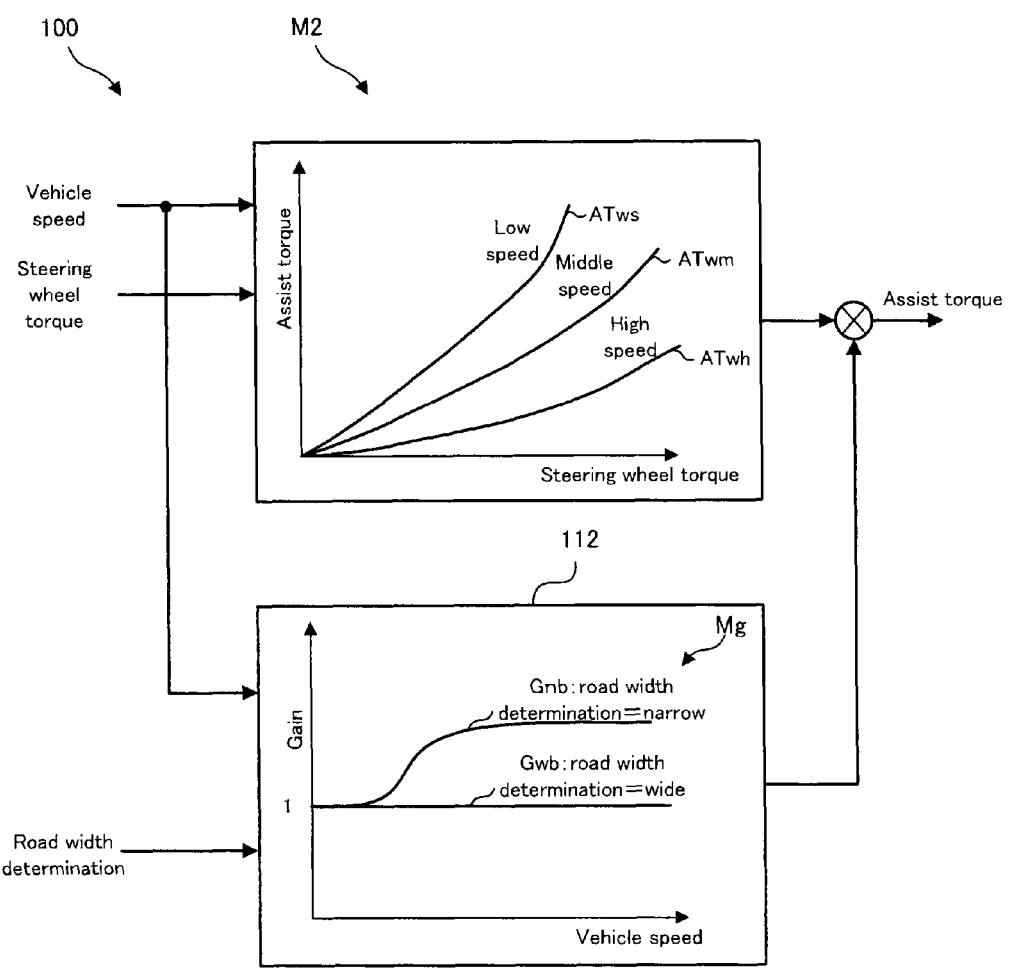
FIG. 7 is a diagram conceptually illustrating a method of setting the assist torque based on the road width determination value in a third embodiment.

FIG. 7 is a diagram conceptually illustrating a method of setting the assist torque based on the road width determination value in the third embodiment.

In FIG. 7, the steering apparatus in the third embodiment is different from the steering apparatus in the second embodiment described above in that the controller 100 has a gain setting unit 112, instead of the gain setting unit 111 (refer to FIG. 6) in the second embodiment. In other points, the steering apparatus in the third embodiment is configured in substantially the same manner as the steering apparatus in the second embodiment described above.

In FIG. 7, in the third embodiment, the controller 100 has the map M2 and the gain setting unit 112.

The map M2 is a map for defining the relationship between the steering wheel torque SWT and the assist torque, as in the second embodiment described above.

The gain setting unit 112 sets the gain in accordance with the road width determination value and the vehicle speed V. Specifically, the gain setting unit 112 has a map Mg for defining a relationship between the vehicle speed V and the gain in each of cases where the road width determination value is set to be "wide" and cases where the road width determination value is set to be "narrow". The gain setting unit 112 sets the gain on the basis of the vehicle speed V, the road width determination value, and the map Mg. The map Mg has map data Gwb and Gnb. The map data Gwb is map data for setting the gain in accordance with the vehicle speed V in cases where the road width determination value is set to be "wide". The map data Gnb is map data for setting the gain in accordance with the vehicle speed V in cases where the road width determination value is set to be "narrow". The map data Gwb and Gnb are set such that the gain in cases where the road width determination value is set to be "narrow" (refer to the map data Gnb) is greater than the gain in cases were the road width determination value is set to be "wide" (refer to the map data Gwb).

The controller 100 sets the assist torque on the basis of the vehicle speed V, the steering wheel torque SWT, and the map M2, and sets the product of the set assist torque and the gain, which is set by the gain setting unit 112, as the final assist torque. Therefore, the driver's steering feeling can be improved.

Fourth Embodiment

A steering apparatus in a fourth embodiment will be explained with reference to FIG. 8.

Figure 8:
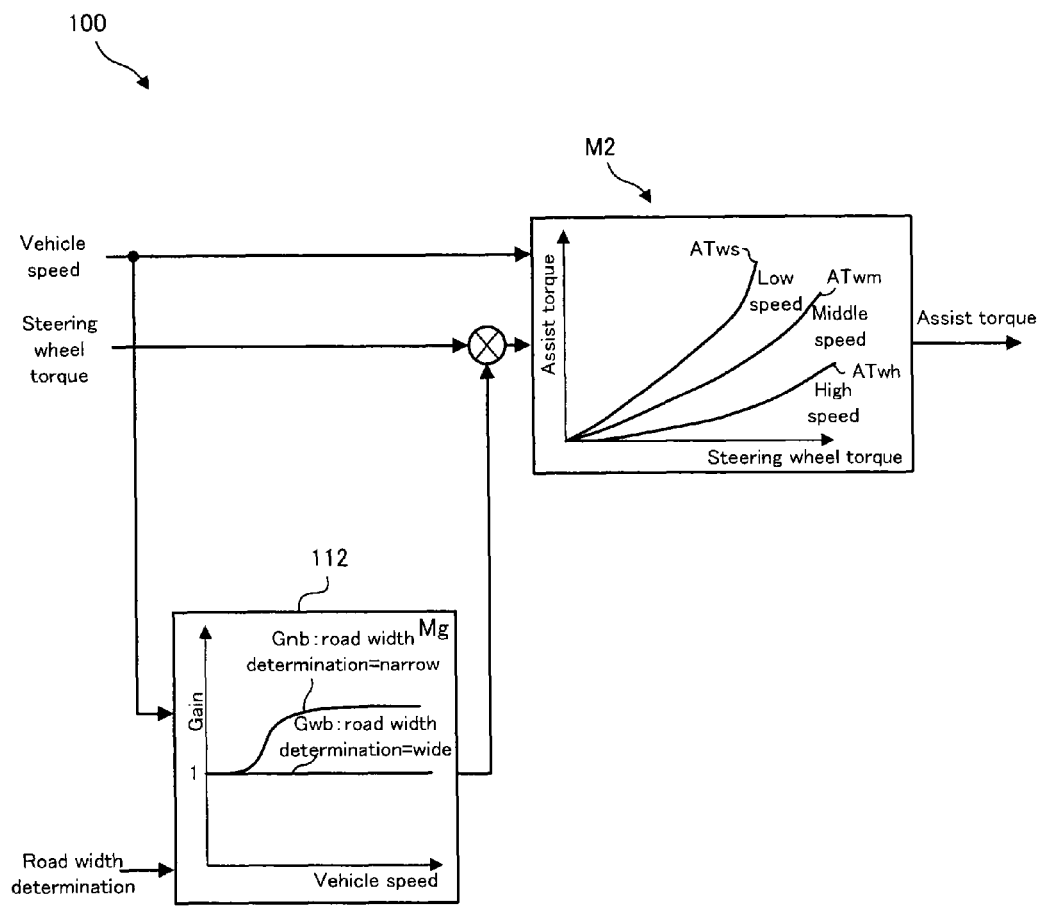
FIG. 8 is a diagram conceptually illustrating a method of setting the assist torque based on the road width determination value in a fourth embodiment.

FIG. 8 is a diagram conceptually illustrating a method of setting the assist torque based on the road width determination value in the fourth embodiment.

In FIG. 8, the steering apparatus in the fourth embodiment is different from the steering apparatus in the third embodiment described above in that the controller 100 uses the product of the gain set by the gain setting unit 112 and the steering wheel torque SWT as new steering wheel torque and in that the controller 100 sets the assist torque on the basis of the new steering wheel torque, the vehicle speed V, and the map M2. In other points, the steering apparatus in the fourth embodiment is configured in substantially the same manner as in the third embodiment described above.

In the fourth embodiment, the controller 100 firstly uses the gain setting unit 112 to set the gain on the basis of the road width determination value, the vehicle speed V, and the map Mg. Then, the controller 100 uses the product of the steering wheel torque SWT obtained from the torque sensor 14 and the gain set by the gain setting unit 112 as new steering wheel torque, and sets the assist torque on the basis of the new steering wheel torque, the vehicle speed V, and the map M2. In other words, in the fourth embodiment, when setting the assist torque, the controller 100 changes the magnitude of the steering wheel torque which is an input value, in accordance with the road width determination value with reference to the map M2. Specifically, in cases where the road width determination value is set to be "narrow", the assist torque is set to have a larger value, by changing the steering wheel torque SWT to have a larger value, in comparison with cases where the road width determination value is set to be "wide". Thus, in cases where the road width determination value is set to be "narrow", the assist torque is set to be larger, in comparison with cases where the road width determination value is set to be "wide". Therefore, the driver's steering feeling can be improved.

Fifth Embodiment

A steering apparatus in a fifth embodiment will be explained with reference to FIG. 9 and FIG. 10.

Firstly, an entire configuration of a vehicle provided with the steering apparatus in the fifth embodiment will be explained with reference to FIG. 9.

Figure 9:
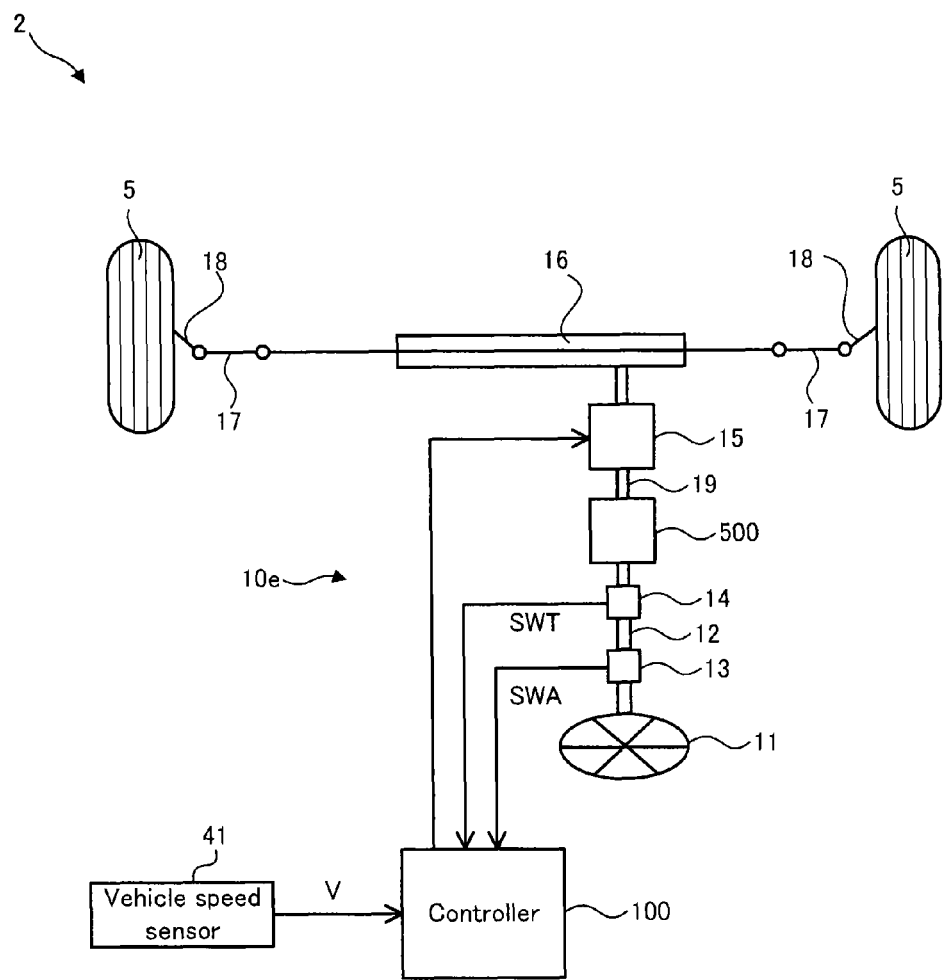
FIG. 9 is a block diagram illustrating an entire configuration of a vehicle provided with a steering apparatus in a fifth embodiment.

FIG. 9 is a block diagram illustrating the entire configuration of a vehicle 2 provided with a steering apparatus 10e in the fifth embodiment.

In FIG. 9, the vehicle 2 in the fifth embodiment is different from the vehicle 1 in the first embodiment described above in that the pinion shaft 19 is equipped with a variable gear ratio mechanism 500. Incidentally, in FIG. 9, the same components as those in the first embodiment illustrated in FIG. 1 will carry the same reference numerals, and an explanation thereof will be omitted, as occasion demands.

The variable gear ratio mechanism 500 is a variable steering gear ratio mechanism (so-called variable gear ratio steering (VGRS)) for changing a steering gear ratio (steering angle ratio) R continuously, which is a ratio between the steering wheel angle SWA and a steering angle $\theta$ of the front wheels 5. Incidentally, various mechanisms can be used as the variable gear ratio mechanism 500, regardless of being known or unknown, as long as the mechanism can vary the steering gear ratio. The steering gear ratio R is expressed by the following equation (7).

$$\text{Steering gear ratio } R = \text{Steering wheel angle SWA} / \text{Steering angle } \theta \quad (7)$$

Figure 10:
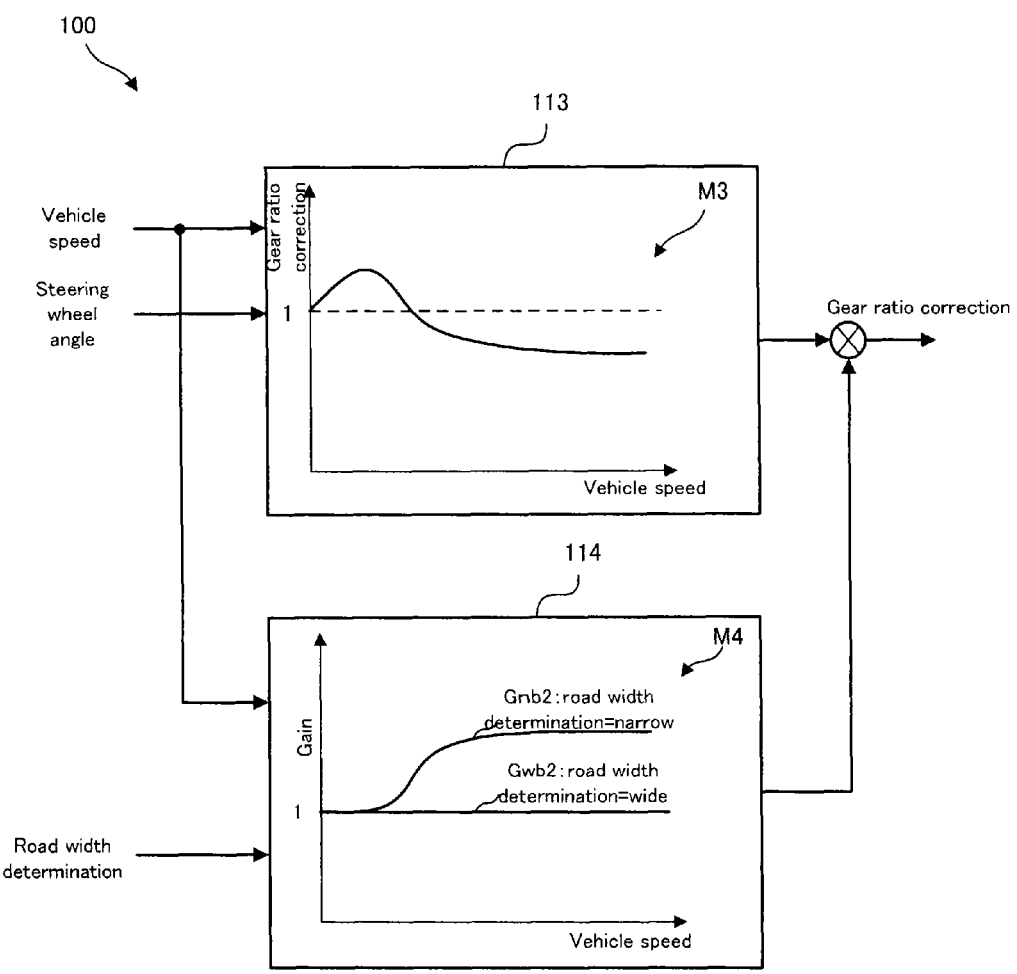
FIG. 10 is a diagram conceptually illustrating a method of setting a steering gear ratio based on the road width determination value in the fifth embodiment.

FIG. 10 is a diagram conceptually illustrating a method of setting the steering gear ratio based on the road width determination value in the fifth embodiment.

In FIG. 10, in the fifth embodiment, the controller 100 sets the steering gear ratio R on the basis of the vehicle speed V and the steering wheel angle SWA. The controller 100 sets a value obtained by multiplying the set steering gear ratio R by a gear ratio correction value, as a final steering gear ratio correction value.

Incidentally, the gear ratio correction value is expressed by the following equation (8).

$$\text{Gear ratio correction value} = \text{Steering gear ratio } R / \text{Steering gear ratio } R' = 1 + \text{VGRS relative angle } \beta / \text{Steering wheel angle SWA} \quad (8)$$

Here, the steering gear ratio R' is a steering gear ratio in cases where the VGRS relative angle $\beta$ is considered and is expressed by the following equation (9). The VGRS relative angle β is a relative rotation angle of the pinion shaft 19 with respect to the steering shaft 12.

Steering gear ratio $R'$=(Steering wheel angle SWA+ VGRS relative angle β)/Steering angle θ　　　(9)

Particularly in the fifth embodiment, the controller 100 changes the gear ratio correction value in accordance with the road width determination value. Specifically, the controller 100 has a basic gear ratio correction value setting unit 113 and a gain setting unit 114.

The basic gear ratio correction value setting unit 113 sets the gear ratio correction value in accordance with the vehicle speed V. Specifically, the basic gear ratio correction value setting unit 113 has a map M3 for defining a relationship between the vehicle speed V and the gear ratio correction value, and sets the gear ratio correction value on the basis of the vehicle speed V and the map M3.

The gain setting unit 114 sets the gain in accordance with the road width determination value and the vehicle speed V. Specifically, the gain setting unit 114 has a map M4 for defining a relationship between the vehicle speed V and the gain in each of cases where the road width determination value is set to be "wide" and cases where the road width determination value is set to be "narrow". The gain setting unit 114 sets the gain on the basis of the vehicle speed V, the road width determination value, and the map M4. The map M4 has map data Gwb2 and Gnb2. The map data Gwb2 is map data for setting the gain in accordance with the vehicle speed V in cases where the road width determination value is set to be "wide". The map data Gnb2 is map data for setting the gain in accordance with the vehicle speed V in cases where the road width determination value is set to be "narrow". The map data Gwb2 and Gnb2 are set such that the gain in cases where the road width determination value is set to be "narrow" (refer to the map data Gnb2) is greater than the gain in cases were the road width determination value is set to be "wide" (refer to the map data Gwb2).

The controller 100 sets the product of the gear ratio correction value set by the basic gear ratio correction value setting unit 113 and the gain set by the gain setting unit 114, as the final gear ratio correction value.

In other words, in the fifth embodiment, the steering gear ratio R is changed (or corrected) in accordance with the road width determination value. Specifically, in cases where the road width determination value is set to be "narrow", the steering gear ratio R is set to have a larger value, in comparison with cases where the road width determination value is set to be "wide". Conversely, in cases where the road width determination value is set to be "wide", the steering gear ratio R is set to have a smaller value, in comparison with cases where the road width determination value is set to be "narrow".

Thus, the driver's steering feeling can be improved. Specifically, in cases where the road width determination value is set to be "narrow", i.e. in cases where the steering power P is greater than the determination reference value Pt+δ/2, in other words, in cases where the manipulated amount of the steering wheel 11 per unit time by the driver is large, the driver can feel that the steering wheel 11 is light and that it is easy to manipulate, because the steering gear ratio R increases and the steering reaction force decreases. On the other hand, in cases where the road width determination value is set to be "wide", i.e. in cases where the steering power P is less than the determination reference value Pt−δ/2, in other words, in cases where the manipulated amount of the steering wheel 11 per unit time by the driver is small, the driver can feel that the steering wheel 11 is stable, because the steering gear ratio R decreases and the steering reaction force increases.

The present invention is not limited to the aforementioned embodiments, but various changes may be made, if desired, without departing from the essence or spirit of the invention which can be read from the claims and the entire specification. A steering apparatus, which involves such changes, is also intended to be within the technical scope of the present invention.

DESCRIPTION OF REFERENCE SIGNS

11 steering wheel
12 steering shaft
13 steering wheel angle sensor
14 torque sensor
15 motor
19 pinion shaft
41 vehicle speed sensor
100 controller

The invention claimed is:

1. A steering apparatus which is mounted on a vehicle and which is configured to steer wheel in accordance with a manipulation of a steering wheel by a driver,
the steering apparatus comprising:
a controller which is configured to calculate a road width of a road on which the vehicle travels, on the basis of a manipulated amount of the steering wheel manipulated by the driver and a change of the manipulated amount in a predetermined period.

2. The steering apparatus according to claim 1, wherein the controller is configured to calculate steering power, which is a manipulated amount of the steering wheel per unit time, on the basis of steering wheel torque which is added to the steering wheel and a steering wheel velocity of the steering wheel, and
the controller calculates the road width of the road on which the vehicle travels on the basis of the calculated steering power.

3. The steering apparatus according to claim 2, wherein the controller is configured to control a steering reaction force to be added to the steering wheel, on the basis of the calculated steering power.

4. The steering apparatus according to claim 3, wherein the controller reduces the steering reaction force in cases where the calculated steering power is large, in comparison with cases where the calculated steering power is small.

5. The steering apparatus according to claim 2, wherein the controller calculates the road width on the basis of a chronological change of the calculated steering power.

6. The steering apparatus according to claim 2, wherein the controller determines whether or not the calculated steering power is greater than a predetermined reference value and calculates the road width on the basis of a result of the determination.

7. The steering apparatus according to claim 6, wherein the controller changes the predetermined reference value in accordance with a vehicle speed of the vehicle.

8. The steering apparatus according to claim 6, wherein the controller sets a dead zone for the predetermined reference value, does not perform the determination if the calculated steering power is within the dead zone, and performs the determination if the calculated steering power is outside the dead zone.

9. The steering apparatus according to claim 1, wherein the controller is configured to control a steering reaction force to be added to the steering wheel, on the basis of the calculated road width.

10. The steering apparatus according to claim 1, wherein
   the controller determines whether or not the vehicle is traveling straight on the basis of the steering wheel torque and a steering wheel angle of the steering wheel,
   when the controller determines that the vehicle is traveling straight, the controller calculates the road width as either narrow road width or wide road width on the basis of the calculated steering power, and
   when the controller determines that the vehicle is not traveling straight, the controller maintains road width calculated immediately before if a non-straight-traveling state does not continue for a predetermined time, and the controller calculates the road width as the wide road width if the non-straight-traveling state continues for the predetermined time.

11. The steering apparatus according to claim 1, wherein the controller is configured to control assist torque for assisting the steering wheel torque, on the basis of the calculated road width.

\* \* \* \* \*